July 20, 1965 M. V. GRUBER ETAL 3,195,870
HELICOPTER TYPE FANS FOR COOLING TOWERS
Filed June 6, 1962 2 Sheets-Sheet 1
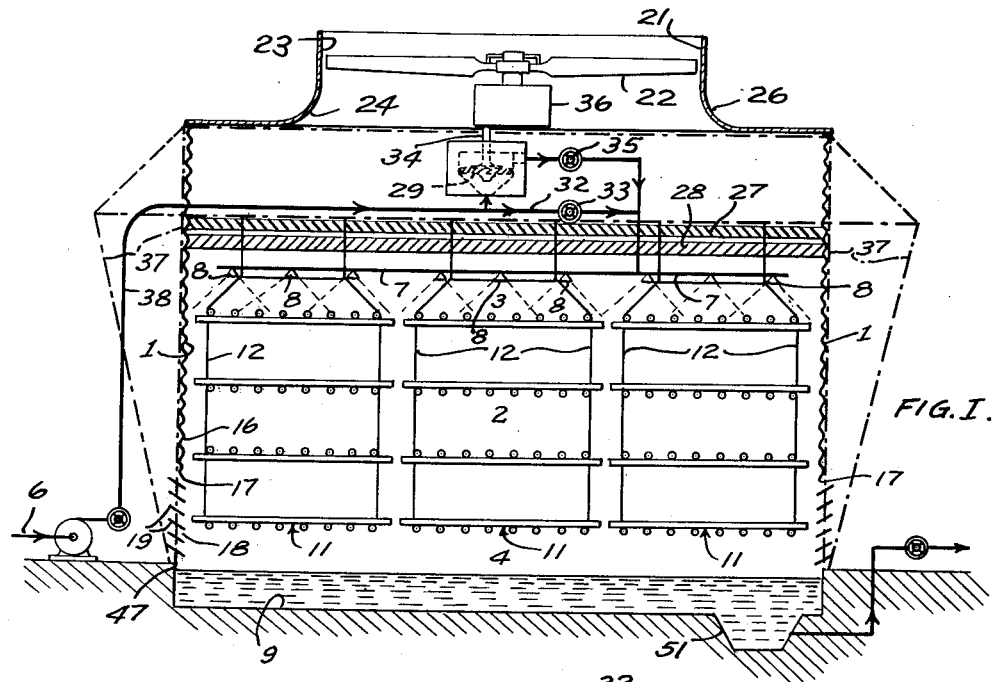
FIG. I.
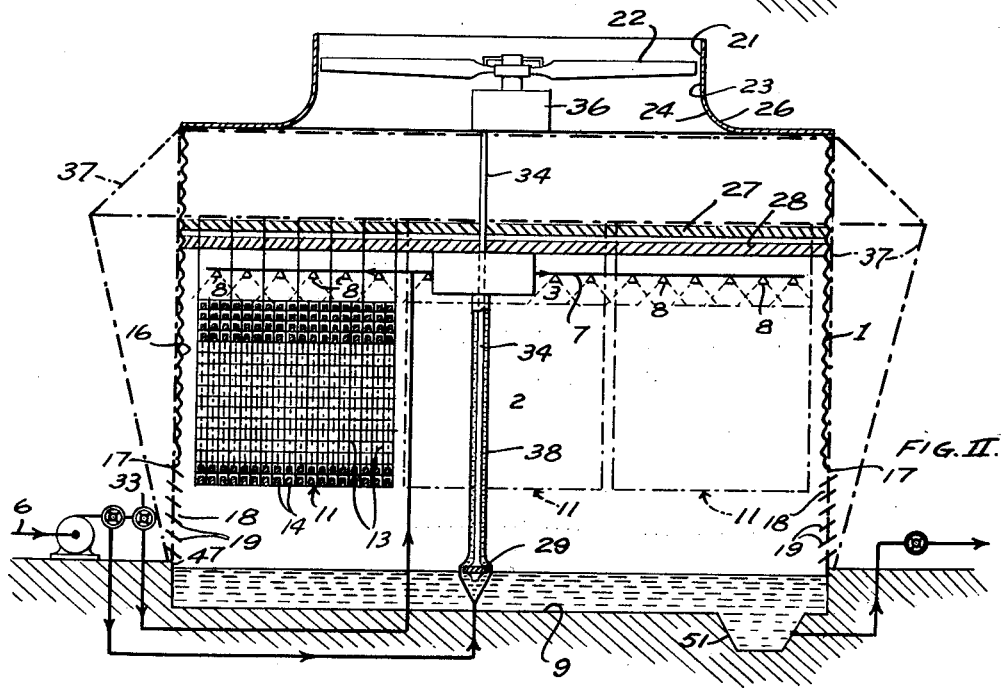
FIG. II.
INVENTORS
MARTIN V. GRUBER
ERNEST E. GOITEIN
BY
ATTORNEY

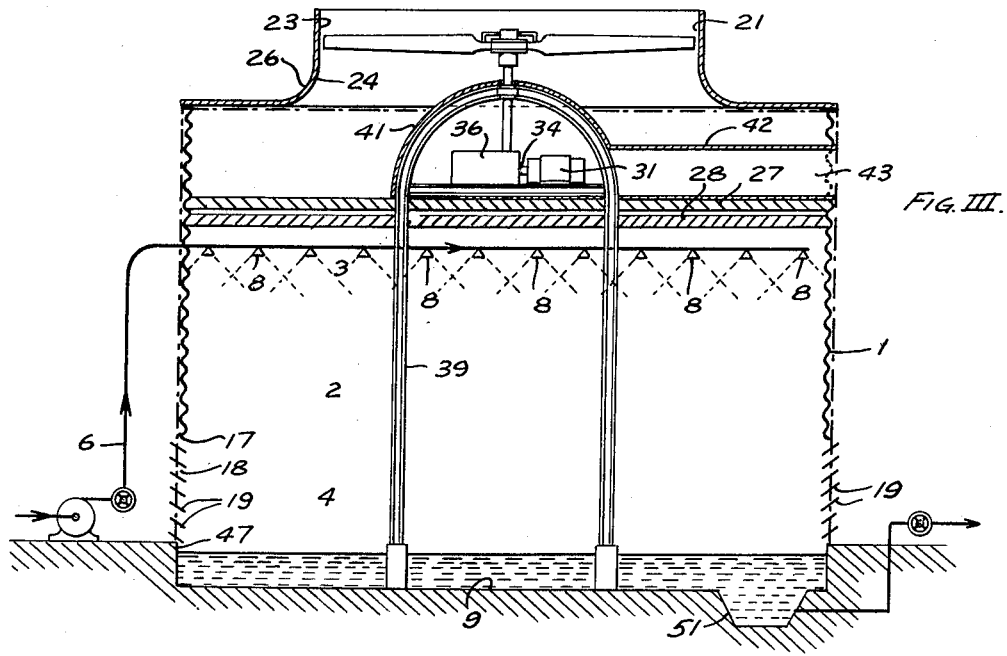
FIG. III.
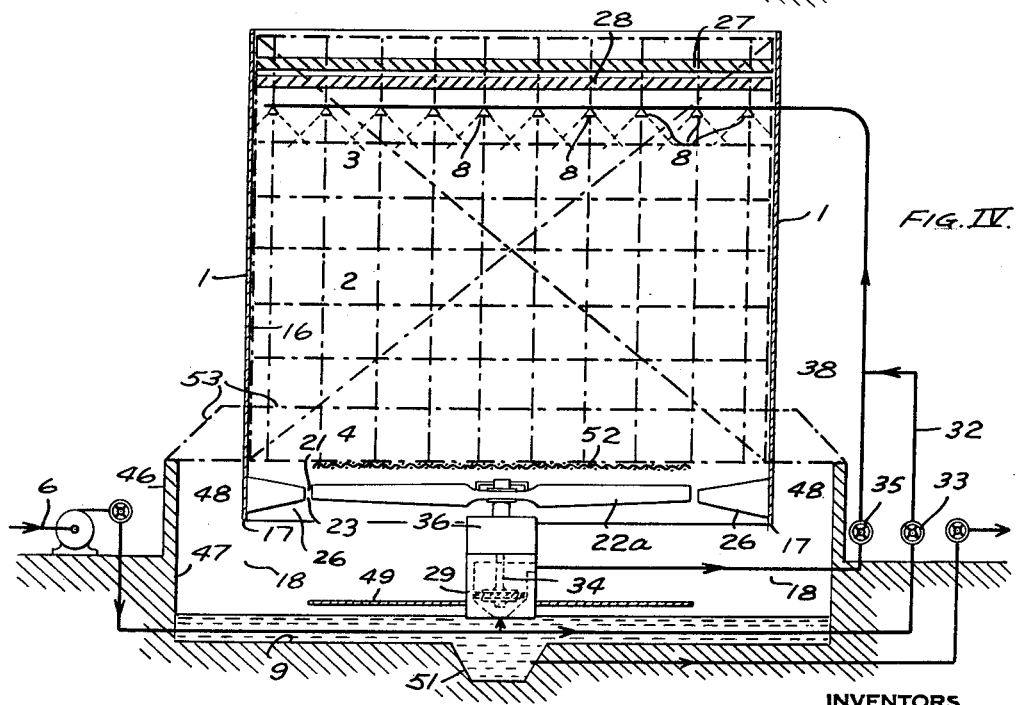
FIG. IV.
INVENTORS
MARTIN V. GRUBER
ERNEST E. GOITEIN
BY
*Charles E. Baxley*
ATTORNEY 3,195,870
HELICOPTER TYPE FANS FOR COOLING
TOWERS
Martin V. Gruber, Campbell, and Ernest E. Goitein, Belmont, Calif., assignors, by mesne assignments, to Fluor Products Company, Inc., Santa Rosa, Calif., a corporation of California
Filed June 6, 1962, Ser. No. 200,375
2 Claims. (Cl. 261—25)

This invention contemplates the inclusion of helicopter type fans in cooling towers.

Throughout the past thirty years, fan development has progressed most notably in the helicopter industry. Versatile helicopter fans of high power and potential efficiency are available. This teaching introduces cooling towers to the advanced technology of the helicopter art.

Basically this combination offers higher fan power so that increased pressure drop through the fill can be accommodated. Thus tighter fill assemblies may be employed to improve air to water contact.

Power is not the sole virtue of helicopter fans in this combination. Control of these fans is highly refined. In specific applications, blade pitch can be automatically varied to impart desired features to the air flow.

Another new dimension of versatility is offered by the ability to incline the fan from the horizontal. For example where wind or other site conditions impose unsymmetrical air input about the tower, fan inclination offers a technique to induce a compensating cross-flow effect. With helicopter fans this inclination can be conveniently controlled.

Helicopter fan sizes are large enough to make turbine drive economical. Turbo-drive also matches various opportunities which occur at plant sites. Pumping must generally be provided for a cooling tower. So, if a water-turbine fan drive is employed, the fan drive head will be an incremental pumping cost with consequent savings. A steam turbine drive also offers obvious operating economies.

These and other advantages will appear more fully from the following description of the invention taken in conjunction with the accompanying drawings wherein:

FIGURE I is a schematic representation of a cooling tower with a helicopter type fan driven by a hydraulic turbine mounted in the upper portion of the casing.

FIGURE II is similar to FIGURE I with the hydraulic turbine mounted in the lower portion of the casing.

FIGURE III is a schematic representation of a cooling tower with a helicopter type fan driven by an electric motor.

FIGURE IV is a schematic representation of a cooling tower with a fan mounted in the lower portion of the casing.

Cooling tower casings must meet architectural and structural standards in addition to participating in the operation of the tower. The casings shown in FIGURES I and II are wooden structures of rigid bent design. Casing 1 defines contact chamber 2 with upper portion 3 and lower portion 4. The casing also defines a generally rectangular plan section enclosing contact chamber 2.

Water or an equivalent low volatility liquid is introduced to the cooling tower by water inflow means shown as inflow line 6.

It is desirable to spread water over the entire plan area of contact chamber 2. Distribution means, shown as header 7 and spray nozzles 8, is located in upper portion 3 so that the water showers downward through contact chamber 2. Nozzles 8 have a spray pattern that insures full coverage of the plan area even with variations in water supply. After descent through the contact chamber water is collected in basin 9.

Decks of fill generally designated 11 retard the fall of water through contact chamber 2. Fill breaks up water drops permitting the water to combine into other drop formations for added cooling by contact with air. Fill may be preassembled in racks for subsequent field erection on wooden frames. It is preferred that hollow fill be employed because it is light enough to be suspended by wires 12 as shown in FIGURE I. Another desirable method of supporting fill is illustrated in FIGURE II where wire grids 13 are mounted in vertical planes spaced from each other. Splash boards 14 are inserted through openings in the wire grids 13 to span between the planes. Whatever method of fill support is employed an economic compromise between the amount and tightness of the fill 11 and the restriction of air flow must be reached. Factors such as plan area, height, pumping head limitations and power costs influence this compromise. Fan draft accommodates tight fill assemblies with improved performance which can be translated into smaller tower sizes and fewer tower units.

Air is introduced into lower portion 4 of the contact chamber. Siding 16 terminates at lower rim 17 so that the casing defines air inlets 18. Louvers 19 are provided to deflect splash inwardly to assure dry ground around the tower and to save water.

Air is exhausted via fan port 21 in which helicopter fan 22 is mounted. Fan port 21 includes cylindrical fan ring 23. Border 24 between fan ring 23 and casing 1 is sealed by transition member 26.

Chevron-type drift eliminators 27 are installed to prevent water droplets entrained in the discharge air from being carried out fan port 21. The air stream is compelled to make sudden turns in navigating drift eliminators 27. The resulting centrifugal force causes drops to separate from the air stream and impinge against the eliminator boards 28 forming a film of water which drops back into the contact chamber.

Helicopter fans give fairly uniform velocity and pressure distribution across the plan area of the contact chamber. The blades are generally made of either monel metal or stainless steel. Blades with fiberglass skins, spongy cores and metal shanks are gaining in popularity. Mechanisms well known to helicopter engineers can vary the pitch of the blades without shut down. Mechanisms which are also well known to helicopter engineers permit controlled variation of fan inclination from the horizontal. An example of such a helicopter-type mechanism can be found in U.S. Patent No. 3,082,826 issued on March 26, 1963, to G. S. Doman et al. No part, however, of the device disclosed in U.S. Patent No. 3,082,826 constitutes any part of applicants' invention. In the adaptation of helicopter designs to cooling tower service, conventional helicopter blade arrangements have been used with very satisfying net performance. Progress on more specific fan adaptation is keeping pace with developments in cooling tower structures, fill and air inlets. Indications are that the application of taper techniques and adjustment of concave and convex faces by procedures well known in helicopter engineering will further improve the uniformity of velocity and pressure over the plan area of the casing. In the meantime, the spread of water can be modified and baffles can be included to help attain desired pressure and velocity distributions.

Air seals have been used about the hub of conventional cooling tower fans to prevent back flow of air at the center. It is contemplated that air seals may also be included on helicopter fans applied to cooling tower service.

The fan may be driven by either a water turbine 29 as shown in FIGURES I, II and IV or by a motor 31 as shown in FIGURE III. In FIGURES I, II and IV water is delivered from line 6 to drive water turbine 29.

Effluent from turbine 29 is delivered to header 7 of the water distribution means.

With turbo-drive, power input to the fan can be controlled hydraulically. Bypass loop 32 communicates water inflow line 6 and header 7 and is arranged in parallel flow relationship relative to water turbine 29. Power input to the fan is controlled by valves 33 and 35 which regulates the diversion of flow from water inflow line 6 through bypass loop 32 to shunt and thereby unload water turbine 29.

The drive means is connected to fan 22 by a well known transmission 34 and speed reduction mechanism 36. Helicopter fans generally require high power input. A helicopter fan is relatively light for its air moving capacity. But such a fan and its related mechanical equipment impose substantial loads. These loads are shown in FIGURES I and II to be supported by rigid frames 37. In FIGURE II riser pipe 38 assists in the support of fan 22 and its mechanical equipment. In FIGURE III a separate steel frame 39 is provided to support motor 31, transmission 34 and speed reduction mechanism 36.

In FIGURE III the mechanical equipment is housed in closure 41 where it is protected from exposure to water. Closed passage 42 communicates closure 41 with access port 43 in the casing to permit entry for maintenance without shut down.

*Fan in lower portion of contact chamber*

FIGURE IV teaches an air inflow arrangement which accommodates the mounting of any type of heavy fan 22a in lower portion 4 of the contact chamber. This location of fan 22a reduces the effects of vibration and wind sway. The superstructure is also lightened and simplified. Enlarged basin 9 embraces lower rim 17 and is spaced therefrom to define air inlets 18 communicating with lower portion 4.

Fan ring 23 is connected to casing 1 so that air is channeled through fan port 21. The transition member 26 which is a lower sloping surface on the fan ring 23 serves to improve the flow of air under fan 22a. The flow of air under fan 22a is further improved by peripheral wall 46 mounted above outer periphery 47 of basin 9. Peripheral wall 46 extends above lower rim 17 to define down passages 48 outside casing 1 so that air entering inlets 18 is directed downward. With the flow patterns here encountered downward air inflow improves its penetration under fan 22a. Plate 49 protects water in sump 51 from being cycloned by the action of fan 22a, the plate 49 extending beyond the sump 51 so as to completely protect the sump from the fall of the fan 22a. If desirable, swirl elimination baffles could also be included. Screen 52 protects fan 22a from falling debris. In the preferred form shown in FIGURE IV, assembly is bridged over fan 22a by truss 53. If properly tied down, suspended fill could be employed.

It will be clear to those skilled in cooling tower engineering and those skilled in helicopter engineering that wide changes may be made in the details of this invention without departing from the scope of invention defined in the claims.

What is claimed is:

1. A cooling tower comprising:
 a casing forming a contact chamber with an upper portion and a lower portion and a plan section, said lower portion having an air inlet therein and said upper portion having an air outlet therein,
 distribution means including a header with nozzles thereon located in said upper portion for spreading water over the plan section whereby said water showers through the contact chamber from the upper portion to the lower portion,
 a water inflow conduit for delivering water to said distribution means,
 fill means located beneath the distribution means within the contact chamber to retard the fall of water,
 a helicopter-type fan means operatively associated with said contact chamber to force air from the air inlet to the air outlet whereby the air comes into direct contact with the water showered from said distribution means, said fan means having a plurality of variable-pitch blades and being inclinable from a horizontal plane,
 a water turbine for driving said fan means,
 transmission means for connecting said turbine to said fan, said water turbine being disposed in said lower portion of said casing,
 a water inflow conduit connecting said water turbine with a source of water to operate said turbine,
 a riser conduit connecting said turbine with said distributing means to supply water from said turbine to said distribution means,
 a fluid by-pass loop means connecting the water inlet conduit to the distribution means in parallel-flow relationship relative to the water turbine, and
 a control means for diverting a portion of water from the water inflow conduit through the by-pass loop to shunt the water turbine thereby regulating the turbine power output to the fan.

2. A cooling tower comprising;
 a casing having a lower rim which surrounds an open bottom, said casing forming a contact chamber with an upper portion and a lower portion and a plan section, said upper portion having an air outlet therein,
 distribution means including a header with nozzles thereon located in said upper portion for spreading water over the plan section whereby said water showers through the contact chamber from the upper portion to the lower portion,
 a water inflow conduit for delivering water to said distribution means,
 fill means located beneath the distribution means within the contact chamber to retard the fall of water,
 an open basin larger in plan section than said casing including a peripheral wall surrounding said lower portion of said casing and a sump approximately centrally located in said basin, said basin being spaced from said lower rim to form an inlet uniformly spaced from said casing, said inlet being a down passage outside said casing which admits air under said lower portion,
 a helicopter-type fan means mounted in said lower portion approximately directly above said sump to force air from said open bottom through said air outlet so that the air comes in direct contact with the water in said contact chamber, said helicopter-type fan means having a plurality of variable pitch blades and being inclinable from a horizontal plan,
 a water turbine for driving said helicopter-type fan means,
 transmission means for connecting said turbine to said helicopter-type fan means, said water turbine being disposed in said lower portion of said casing,
 a water inflow conduit connecting said water turbine with a source of water to operate said turbine,
 a riser conduit connecting said turbine with distribution means to supply water from said turbine to distribution means,
 a fluid by-pass loop means connecting the water inlet conduit to the distribution means in parallel-flow relationship relative to the water turbine,
 a control means for diverting a portion of water from the water inflow conduit through the by-pass loop to shunt the water turbine thereby regulating the turbines power output to the fan,
 a fan ring surrounding said helicopter-type fan means and forming a border between said fan means and said casing, said fan ring having a sloping surface to channel air to said fan, and a plate horizontally mounted between said sump and said fan, said plate having an edge which extends substantially beyond said sump to prevent said fan from pulling water upwardly that collects in said sump.

References Cited by the Examiner

UNITED STATES PATENTS

| | | | |
|---|---|---|---|
| 612,383 | 10/98 | Dean. | |
| 786,113 | 3/05 | Grohman | 261—25 |
| 803,925 | 11/05 | Ohde. | |
| 1,002,578 | 9/11 | Gayley. | |
| 1,999,500 | 4/35 | Carswell et al. | 50—54 X |
| 2,002,065 | 5/35 | Kryszewski et al. | 261—109 |
| 2,316,940 | 4/43 | Dewey et al. | |
| 2,447,957 | 8/48 | Moore | 230—120 |
| 2,672,328 | 3/54 | Mort et al. | 261—25 |
| 2,752,124 | 6/56 | Nofziger | 261—29 |
| 3,082,826 | 3/63 | Doman et al. | 170—135.7 |

FOREIGN PATENTS

| | | |
|---|---|---|
| 1,144,466 | 4/57 | France. |
| 1,158,377 | 1/58 | France. |
| 531,366 | 8/31 | Germany. |
| 945,329 | 7/56 | Germany. |
| 1,111,220 | 7/61 | Germany. |
| 10,025 | of 1897 | Great Britain. |
| 160,990 | 4/21 | Great Britain. |
| 224,557 | 5/25 | Great Britain. |
| 289,118 | 4/58 | Great Britain. |
| 841,089 | 7/60 | Great Britain. |

HARRY B. THORNTON, *Primary Examiner.*

HERBERT L. MARTIN, *Examiner.*